INVENTOR.
HAROLD W. PRICE
EARL R. PRICE
BY H. O. Clayton
ATTORNEY

Nov. 24, 1936.  H. W. PRICE ET AL  2,061,590

CLUTCH CONTROL MECHANISM

Filed Feb. 12, 1932  2 Sheets-Sheet 2

INVENTOR.
HAROLD W. PRICE
EARL R. PRICE
BY H. O. Clayton
ATTORNEY

Patented Nov. 24, 1936

2,061,590

UNITED STATES PATENT OFFICE 2,061,590

CLUTCH CONTROL MECHANISM

Harold W. Price and Earl R. Price, South Bend, Ind., assignors to Bendix Aviation Corporation, South Bend, Ind., a corporation of Delaware Application February 12, 1932, Serial No. 592,582

4 Claims. (Cl. 192—.01)

This invention relates to power means for operating a conventional automotive clutch and is particularly designed as an improvement over the mechanism suggested in the patent to Belcia, No. 1,470,272, dated October 9, 1923.

This patent, in brief, discloses a vacuum operated fluid motor for disengaging the clutch, the control valve for the motor being operated by the accelerator pedal. There is also disclosed in this patent a positive connection between the pedal and valve which necessitates a careful adjustment of the parts when this mechanism is incorporated as an accessory in a used automobile.

It is the principal object of the invention to avoid this difficulty by providing a compact valve or control unit including electrical means for operating the valve, and which electrical means is remotely controlled by a switch operated by accelerator pedal. The control unit may thus be conveniently secured to a rigid part of the vehicle and the flexible lead wires run to the accelerator pedal switch, which installation is quickly effected.

A particular object of the invention is to provide an efficient control unit for the clutch motor and to that end there is suggested a one-piece casing housing a solenoid, relay valve parts and three-way valve parts, the latter to directly control the operation of the motor. The aforementioned elements are so constructed and arranged as to provide for an operation of the relay valve by the solenoid, said valve in turn to control the operation of the motor control valve.

A further object of the invention is to provide power means for operating the relay valve, and which power means includes a spring, the latter being so arranged with respect to the remaining parts as to function as a means for operating the three-way motor controlling valve.

Yet another object of the invention is to provide electrical means for indirectly operating a three-way motor control valve, and which means is designed to use a minimum of current.

Other objects of the invention and desirable details of construction and combinations of parts will become apparent from the following description of a preferred embodiment, which description is taken in conjunction with the accompanying drawings, in which.

Figure 1:
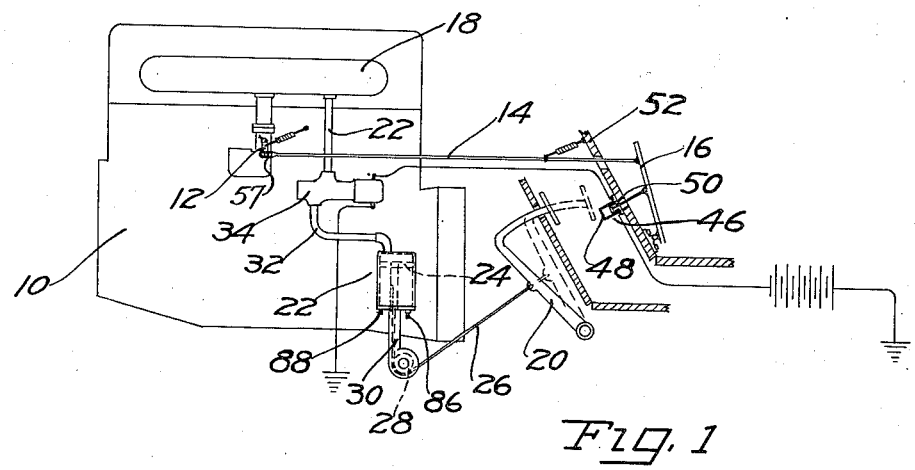
Figure 1 is a diagrammatic view disclosing the essential elements of the power operated clutch control mechanism including the instant invention.
Figure 5:
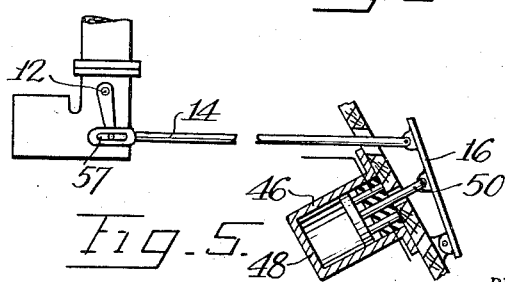
Figure 4:
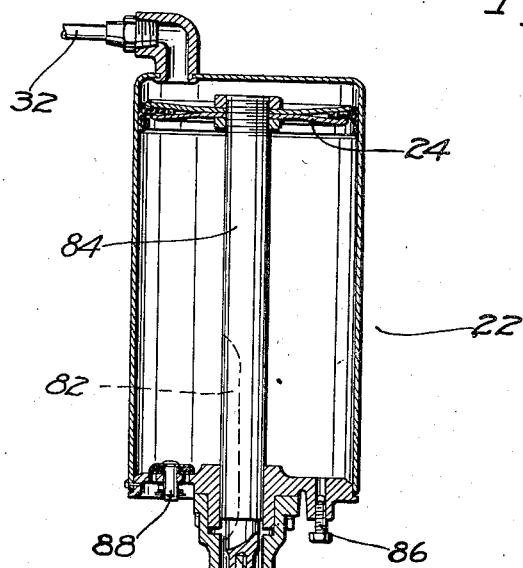

Figure 4 discloses, in longitudinal section, the details of the vacuum operated motor unit; and Figure 5 is an enlargement of certain of the mechanism of Figure 1, including the accelerator operated switch and the throttle operating linkage.

Referring now to the general arrangement of parts disclosed diagrammatically in Figure 1, there is provided an internal-combustion engine 10 having the usual throttle 12, throttle rod 14, accelerator 16, intake manifold 18 and clutch pedal 20. At closed throttle a vacuum of some twenty inches of mercury is induced in the manifold 18 by virtue of the pumping action of the engine pistons, and this evacuated condition of the manifold is employed to energize a clutch controlling fluid motor 22, the piston 24 of the latter being connected to the clutch pedal 20 by a flexible cable 26 passed over a sheave 28 mounted in the end of a projection 30 extending from the motor casing. A control valve for the motor is interposed in a fluid conduit 32, the latter interconnecting the manifold and clutch motor. The control valve and means for operating the same are compacted in a single control unit designated by the reference numeral 34 in Figure 1. Thus far described the mechanism is, in a general way, similar to that disclosed in the patent to Belcia, No. 1,470,272, the instant invention constituting an improvement thereover.

Describing now the refinements of the present invention, the unit 34 preferably comprises a one-piece casing 36, the latter housing a solenoid 37 and axially aligned reciprocable piston valve members 38 and 40. Valve member 38 is bored to receive the flanged end of the valve member 40 and counterbored to provide a chamber 42 to receive a spring 44, the latter abutting the end of the member 38. The solenoid is energized by the closing of a switch 46, the relatively movable parts 48 and 50 of which are secured to a floor board 52 and to the accelerator pedal 16, respectively.

Describing now the operation of the aforementioned mechanism, when the engine 10 is started with the throttle closed the aforementioned vacuum is created in the manifold 18. The accelerator pedal 16 is at this time released to thereby close the switch 46, all as disclosed in Figures 1 and 5. The solenoid 37 is thus energized, a movable armature member 54 of which is drawn into a winding 56. A slot 57 in the link 14 is so positioned with respect to the throttle 12 as to insure a complete closing of the throttle before the switch 46 is closed.

Figure 2:
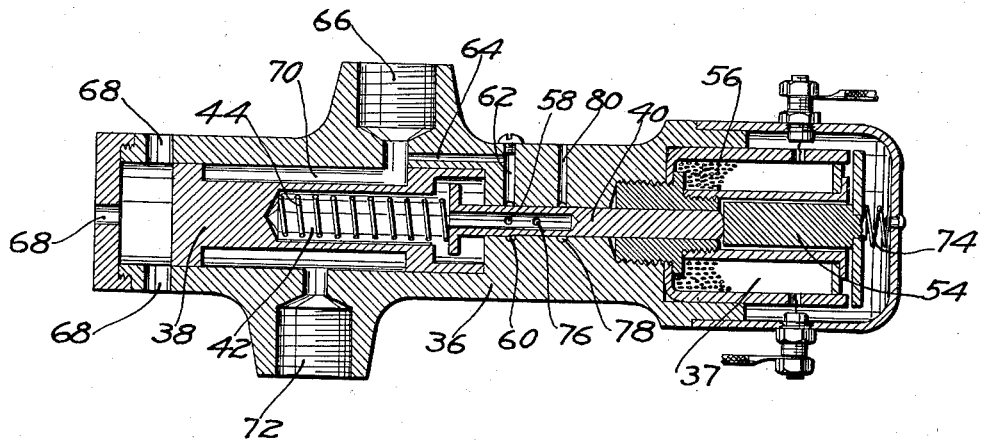
Figures 2 and 3 are longitudinal sectional views taken through the control unit constituting the essence of the invention.

The armature member 54 contacts the end of the piston valve member 40 forcing the same to the left to the position disclosed in Figure 2. In this position an opening 58 in the member 40 registers with a groove 60 in the casing 36, the groove registering with interconnected ducts 62 and 64. Duct 64 registers with a port 66 in the casing 36, which port is connected to the manifold by the upper portion of the flexible conduit 32. The air in the chambers defined by the bores in the valve members 38 and 40 is then drawn out, creating a partial vacuum in said chambers. Valve member 38 is then forced to the right to the position disclosed in Figure 2 by virtue of the pressure of the atmosphere, the latter being admitted to the casing 36 via ports 68. The spring 44 is compressed by this movement.

The aforementioned movement of the piston valve member 38 to the right serves to register, via a recess 70 in the member 38, port 66 with a port 72, the latter being connected to the lower section of the conduit 32. The clutch motor 22 is thus placed in communication with the manifold at closed throttle to evacuate the same and move the piston 24 upwardly. The clutch pedal is thus moved to disengage the clutch, as disclosed in Figure 1.

It will be noted that such action occurs whenever the accelerator pedal is released; therefore, the clutch is automatically disengaged whenever the throttle is closed by the accelerator, whether the vehicle be parked or in motion.

Figure 3:
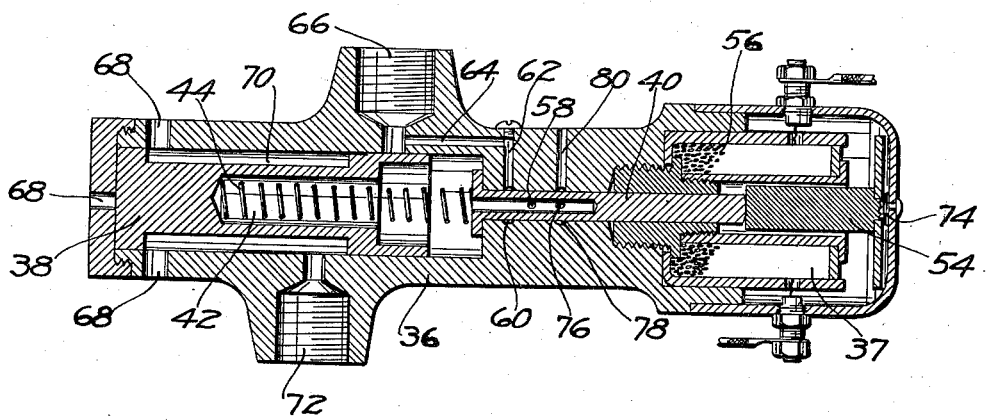

Describing now the operation of the mechanism to engage the clutch, opening of the throttle by depressing the accelerator pedal serves to open the switch 46. The solenoid 37 is thus deenergized, permitting a tensioned spring 74 to withdraw the armature plunger 54. The compressed spring 44 then moves the valve member 40 to the right to register a port 76 with a groove 78, the latter vented to the atmosphere via a duct 80. Air then rushes into the bores of the valve members 38 and 40, permitting spring 44, which has been only partially expanded, to move the piston valve member 38 to the left, to first cut off the interconnection of port 66 with port 72 and then register atmospheric ports 68 with the port 72 via the recess 70. The valve parts in the position just described are disclosed in Figure 3 of the drawings.

Air is thus permitted to flow into the evacuated end of the clutch motor 22 and permit the clutch to engage under the action of its spring. The rate of such engagement may be controlled by regulating the efflux of air from the compression side of the motor, this being accomplished by the provision of a slot 82 in a piston rod 84 and an adjustable needle valve 86. A check valve 88 insures the clutch disengaging movement of the piston.

There is thus provided a very compact and effective control unit which may be conveniently secured to any rigid portion of the vehicle, such as the motor casing, thereby facilitating a field installation of the clutch control mechanism on a used automobile.

Briefly reviewing the parts of the unit 34 and its several functions, it will be seen that the ported casing 36 and recessed piston member 38 together constitute a three-way control valve for the clutch operating fluid motor 22; that the ported casing 36 and ported piston member 40 together constitute a relay valve member; that the solenoid 37 serves as a power means for operating the relay valve in one phase of its operation; that the relay valve serves to control a source of vacuum power to operate the aforementioned three-way valve opening the same to energize the clutch motor; and that a spring interposed between the aforementioned valves serves to actuate the relay valve in the second phase of its operation and also serves as a power means to operate the aforementioned three-way valve to close the same and deenergize the clutch operating motor.

While one illustrative embodiment has been described, it is not my intention to limit the scope of the invention to that particular embodiment, or otherwise than by the terms of the appended claims.

I claim:

1. In an automotive vehicle provided with an internal-combustion engine, a clutch and a throttle, means for operating the throttle, engine operated power means for operating the clutch, a control valve for said power means and means for controlling the operation of said control valve, said latter means comprising an electrically operated relay valve, the latter valve being controlled by the aforementioned throttle operating means.

2. In an automotive vehicle provided with an internal-combustion engine, a clutch and a throttle, means for operating the throttle, vacuum operated power means for operating the clutch, a vacuum operated control valve for said power means and means for controlling the operation of said control valve, said latter means comprising a relay valve, the operation of which valve is controlled by the aforementioned throttle operating means through the intermediary of a solenoid.

3. In an automotive vehicle provided with a clutch, a throttle and means for operating the throttle, power means for operating the clutch, a control valve for said power means, common means for rendering said power means and valve operative and means, controlled by the throttle operating means, for operating said control valve comprising a solenoid operated relay valve.

4. In an automotive clutch controlling mechanism including a fluid motor adapted to operate a clutch, a control valve for said motor, power means for operating said valve, said means including a spring, means for controlling said power means including a piston valve, electrical power means for operating said last mentioned control means and manually operated switch means for controlling the operation of said last mentioned power means.

HAROLD W. PRICE.
EARL R. PRICE.